(12) United States Patent
Funk (10) Patent No.: US 11,207,157 B2
(45) Date of Patent: Dec. 28, 2021

(54) SCAN ABUTMENT FOR A DENTAL IMPLANT HAVING REDUCTION OF THE FIT CLEARANCE

(71) Applicant: HERAEUS KULZER GMBH, Hanau (DE)

(72) Inventor: Matthias Funk, Hanau (DE)

(73) Assignee: Kulzer GmbH, Hanau (DE)

( * ) Notice: Subject to any disclaimer, the term of this patent is extended or adjusted under 35 U.S.C. 154(b) by 561 days.

(21) Appl. No.: 15/771,428

(22) PCT Filed: Oct. 26, 2016

(86) PCT No.: PCT/EP2016/075791
§ 371 (c)(1),
(2) Date: Apr. 27, 2018

(87) PCT Pub. No.: WO2017/072169
PCT Pub. Date: May 4, 2017

(65) Prior Publication Data
US 2018/0344432 A1  Dec. 6, 2018

(30) Foreign Application Priority Data
Oct. 27, 2015 (DE) ..................... 10 2015 118 286.6

(51) Int. Cl.
*A61C 8/00* (2006.01)
*A61C 9/00* (2006.01)

(52) U.S. Cl.
CPC ............ *A61C 8/0001* (2013.01); *A61C 8/006* (2013.01); *A61C 8/0062* (2013.01); *A61C 8/0068* (2013.01); *A61C 9/004* (2013.01)

(58) Field of Classification Search
CPC ..... A61C 8/0001; A61C 8/006; A61C 8/0062; A61C 8/0068; A61C 8/0069; A61C 9/004; A61C 9/0046

USPC ......................................................... 433/173
See application file for complete search history.

(56) References Cited

U.S. PATENT DOCUMENTS 4,731,085 A   3/1988  Koch
5,061,285 A * 10/1991  Koch ................... A61C 8/0065
                                                    433/173
(Continued)

FOREIGN PATENT DOCUMENTS

DE   102007050285 B4   7/2009
DE   102010060567 B4   7/2012
(Continued)

*Primary Examiner* — Matthew M Nelson
(74) *Attorney, Agent, or Firm* — Norris McLaughlin, P.A.

(57) ABSTRACT

The invention relates to a scan abutment (2), in particular an integrally manufactured scan abutment, for determination of the position of the front face (1.1) of a dental endosseous implant (1), wherein the abutment (2) has a longish, hollow shaft (4), and the shaft has an upper region (4.1), a central region (4.2) and a lower region (4.3). Moreover, the shaft (4) of the scan abutment with its central region (4.2) is attachable onto the front face (1.1) of the implant (1), and its lower region (4.3) is insertable into the connection geometry of the implant. The longish, hollow shaft (4) has a side wall (10). The shaft of the scan abutment has at least two to terminally extending slits (5) in its central region (4.2) and lower region (4.3) in the side wall (10). Two, three or four slits are preferred. Preferably, the slits (5) end in one recess (6) each, such as a circular recess, in the side wall (10) at their upper end and extend terminally in the side wall (10) to the bottom side of the shaft (4). Another subject matter of the invention is a kit comprising a scan abutment as well as the screw adjusted to the scan abutment or the bolt adjusted to the scan abutment.

17 Claims, 7 Drawing Sheets

(56) References Cited

U.S. PATENT DOCUMENTS

| | | | | |
|---|---|---|---|---|
| 5,468,150 A | * | 11/1995 | Brammann | A61C 8/0065 433/173 |
| 5,782,918 A | * | 7/1998 | Klardie | A61C 8/0066 606/60 |
| 2002/0110784 A1 | * | 8/2002 | Kumar | A61C 8/008 433/173 |
| 2005/0019726 A1 | * | 1/2005 | Augthun | A61C 8/0069 433/173 |
| 2006/0217738 A1 | * | 9/2006 | Tanimura | A61C 8/005 606/104 |
| 2011/0097687 A1 | * | 4/2011 | Engman | A61C 8/0068 433/174 |
| 2014/0242545 A1 | * | 8/2014 | Brun | A61C 8/0028 433/173 |
| 2015/0313692 A1 | * | 11/2015 | Vizanski | A61C 8/005 433/173 |
| 2016/0081773 A1 | * | 3/2016 | kim | A61C 8/006 433/170 |
| 2016/0113739 A1 | * | 4/2016 | Honig | A61C 8/0001 433/173 |
| 2016/0317251 A1 | * | 11/2016 | Kim | A61C 8/0062 |
| 2017/0202649 A1 | * | 7/2017 | Bernhard | A61C 1/084 |

FOREIGN PATENT DOCUMENTS

| | | |
|---|---|---|
| DE | 10 2013 101 879 A1 | 8/2014 |
| EP | 0 180 247 A1 | 5/1986 |
| EP | 2130514 A1 | 12/2009 |

\* cited by examiner

SCAN ABUTMENT FOR A DENTAL IMPLANT HAVING REDUCTION OF THE FIT CLEARANCE

This application is a 371 of PCT/EP2016/075791, filed Oct. 26, 2016, which claims foreign priority benefit under 35 U.S.C. § 119 of the German Patent Application No. 10 2015 118 286.6, filed Oct. 27, 2015, the disclosures of which patent applications are incorporated herein by reference.

The invention relates to a scan abutment, in particular an integrally manufactured scan abutment, for determination of the position of the front face and the position/direction of the longitudinal axis of a dental endosseous implant, wherein the abutment has a longish, hollow shaft, and the shaft has an upper region, a central region and a lower region. Moreover, the shaft of the scan abutment with its central region is attachable onto the front face of the implant, and its lower region is insertable into the connection geometry of the implant. For example, the shaft has a cylindrical, preferably outside-hexagon socket- or octagon socket-periphery in the lower region to be received into the corresponding inside-octagon or inside-hexagon socket geometry of an implant. According to the invention, the shaft may also have a different connection geometry, such as e.g. a cylindrical with 3 noses staggered on 120° or a star-shaped connection geometry.

The longish, hollow shaft has a side wall. The shaft of the scan abutment has at least two to terminally extending slits in its central region and lower region in the side wall, in particular the slits are substantially axial slits. Two, three, four, five, six, seven or eight axial slits are preferred. Preferably, the slits end in one recess each, such as a circular recess, in the side wall at their upper end and extend to terminally to the bottom side of the shaft. Another subject matter of the invention is a kit comprising a scan abutment as well as the screw adjusted to the scan abutment or the bolt adjusted to the scan abutment.

In dental prosthetics, CIM processes (computer-integrated manufacturing), such as CAD/CAM methods, increasingly gain in importance. Like this, it has meanwhile become customary in implant prosthetics to digitise the implant and residual tooth situation in the mouth of the patient and to design and manufacture the tooth replacement using CAD/CAM. So-called scan abutments are employed for digitization of the orientation of the implants by scanning a plaster model or the implants in the mouth of the patient.

Usually, scan abutments are cylinder-shaped devices made of a plastic, being screwed together with the implants with low fitting tolerance. These devices allow determining the three-dimensional position of the implants in the jaw via an optical scan with a table or intraoral scanner. The scan of the scan abutments thus serves for measuring as accurately as possible the position of the implants by scan of a plane parallely staggered in height of the upper side of the scan abutments and of the shaft of the scan abutment, of the plane of the front face of the implant as well as of the orientation of the implant. This works quite well for single implants being provided with one implant abutments and one crown. The height determination of the implant front face of scan abutments is made indirectly via determination of the height and orientation of the upper front face of the scan abutment.

For this purpose, the scan abutments of the state of the art have a longish shaft of a defined height to be able to determine the axis direction and x-y position of the implant in the jaw. In the simplest design, the shafts are circular, but also other cross-sections are usual. In addition, e.g. also conical and/or spherical geometries are also known (e.g. CADstar).

In the case of so-called bridge constructions, where two or more implants are used as support for a prosthetic treatment, such as a dental bridge or a bar, up to now, the accuracy of the digitisation often is still not enough.

This is due to, on the one hand, the limited accuracy of the scanner and, on the other hand, the tolerances on the part of implant and scan abutment, the fitting geometry of which must be designed with a tolerance of a number of $1/100$th mm in order to fit together in any case. Scan abutments available in the market have the disadvantage of the screwing as well as of the inaccuracy by the fitting tolerance between the scan abutment and the implant.

The occlusal plane of the implants must very accurately be determined for production of accurately fitting prosthetic treatments over a number of implants, because in bridge constructions the implants are connected to each other via the prosthetic treatment. In the case of inaccurate data of the occlusal plane, the prosthetic treatment manufactured lacks a precise fit.

In general, scan abutments as well as the digitisation of which via an optical scanner belong to the state of the art, but the systems is limited again and again by the accuracy. Thus, up to now, rescanning of the dental model in the production and adjusting of the data is required for implant bridges.

Thus, up to now, the implant positions must be rescanned in the production based on the plaster model in the case of digitised production of the dental bridges supported by implants, and the coronal seating surfaces (coronal planes of the implants) must be newly determined despite available 3D-construction data. This rescanning is particularly time-consuming because the plaster model must be send in together with the 3D-construction data from the dental laboratory to a central manufacturer. The central laboratory then rescans the dental model prior to the production of bridges supported by implants and adjusts the digital data.

It was the object of the invention to find a way how the aforementioned tolerance in the fitting geometry may be minimized and, in particular, completely eliminated. A further object was to find a better way than a screwing for the connection of implant and scan abutment. This connection shall allow the same or better accuracy of the arrangement of the scan abutments and the implant and preferably be faster to fasten and to release. Furthermore, attempts should be made to provide a further scannable planar plane for improvement of the data accuracy. In addition, it was the object to achieve as possible a coaxial arrangement of the scan abutment on the implant. Further objects of the present invention were to minimize the tolerances in scanning the implant situation and, preferably at the same time, to improve the data base for the constructions on dental implants. In particular, it was the object to develop scan abutments enabling an improved data accuracy of the mesial, buccal, labial, oral and/or occlusal planes of the scan abutment(s) and thus of the coronal front face(s) and of the position of the implant(s).

In particular, the aim is to develop a scan abutment in order to enable an all-digital process, thus preferably without the necessity of the production and/or delivery of a real jaw model, in which the scan of the real jaw situation inside the mouth of the patient provides sufficiently accurate data to be able to directly produce a temporary prosthetic treatment and/or permanent prosthetic treatment from the digital data thus obtained. Besides crowns, the aforementioned prosthetic treatments shall preferably also enable the all-digital production of implant bridges and implant bars on at least two or more implants, or implants optionally provided with spacers. According to the invention, implant bridges or bars should be understood to means prosthetic treatments over more than two teeth, preferably up to 16 teeth.

The object is solved by a scan abutment according to claim 1, wherein advantageous embodiments are shown in detail in the subclaims as well as in the description.

The object of clearly reducing the tolerance in the fitting geometry could be solved by the scan abutment being expanded in the region of the fitting to the implant and thus directly being centrally orientated and connects the two partners with each other without tolerance. A coaxial arrangement of the longitudinal axis of the scan abutments and of the longitudinal axis of the implant may be achieved by this measure. The manufacturing tolerance may be considerably improved by the scan abutment according to the invention. Up to know, the manufacturing accuracy could amount up to 0.06 mm, because, up to know, different tolerances have a cumulative effect by adding the tolerance "connection scan abutment" to the tolerance "connection implant" as well as also to the tolerance "concentricity of the shaft outer shell scan abutment", such that the total tolerance is given as follows, i.e. e.g $T_{total}=0.02+0.02+0.02=0.06$ mm. The expandable scan abutments according to the invention eliminate the tolerances for the joining gap, giving $T_{total}=0+0+0.02=0.02$ mm. Thus, the tolerance may be improved by almost 70% or by factor three, respectively, by the scan abutment according to the invention.

A further object could be solved by clamping the scan abutment according to the invention to the implant. This new method according to the invention of the connection of the scan abutment and implant may be made with the expandable scan abutments according to the invention for the first time. Up to know, scan abutments were screwed together with the implant by a screw. The clamping according to the invention implies a simplification of handling of the scan abutments for the user in the dental laboratory or the dentist, and results in significant saving of time.

The tolerance between scan abutment and implant may be reduced with the expandable scan abutments according to the invention by clamping or screwing the scan abutment in expanded state with an almost circumferential line of one or more edge(s) of the outer periphery of the shaft against the inner surface of the connection geometry of the implant. Thus, the expandable scan abutment according to the invention allows a defined coming together of contact points of the side wall of the scan abutment with the inner surface of the connection geometry of the implant. According to the invention, the scan abutment according to the invention is material-integral, i.e. an integral scan abutment, i.e. a scan abutment made from one piece of material.

In the case of surfaces coming together, as it is usual in the case of the scan abutments of the state of the art, it may never be ruled out that the surfaces have a certain roughness or waviness such that defined contact points are not present. In the worst case, surfaces such coming together may slide against each other, this is also called migrating.

The invention also provides a proposed solution as to how the tolerances of the height position within the scan abutment may be minimized as possible. For this purpose, the distance of the planar-parallel planes of the coronal front face of the implants and of the surface(s) to be scanned of the scan abutment is significantly reduced.

The objects of the invention were solved by a scan abutment for determination of the position (x,y,z-coordinates) of the front face of a dental endosseous implant, wherein the abutment has a longish, hollow shaft, wherein the shaft has an upper region, a central region and a lower region, and the shaft with its central region with at least a part of its bottom side is attachable onto the front face of the implant, and the lower region is insertable into the connection geometry or synonymously fitting geometry, respectively, of the implant, wherein the longish, hollow shaft is formed from a side wall, and the shaft is expandable in its central region and lower region in the side wall, in particular the shaft has at least two to terminally extending slits in its central region and lower region, in particular axial slits. Further preferably, the shaft has three, four or more slits, such as 2, 3, 4, 5, 6, 7, 8. Where appropriate, the shaft may also have 9, 10, 11, 12, 13, 14, 15, or more slits. It is the core of the invention that the shaft is expandable to terminally in its lower region and, optionally, central region. Basically, the scan abutment could also be mounted on spacers, if it seems to be useful in individual cases. Thus, the axial slits preferably lie in a plane extending through the longitudinal axis and, furthermore, are parallely orientated to the axis of the longitudinal axis. Preferably, the shaft may have at least two to terminally extending a) axial slits in its central region and lower region in the side wall, in particular slits being axial and extending parallely to the longitudinal axis. Alternatively, b) the slits may also have an inclined orientation with respect to the longitudinal axis instead of axial, in particular the slits are inclined from 10° to 30° out of the plane in which the longitudinal axis is laying.

Preferably, the slits are parallely arranged the longitudinal axis of the shaft of the central region. Moreover, the shaft with its central region with its bottom side, wherein the bottom side preferably is a planar-parallel surface, is preferably completely attachable onto the front face of the implant.

According to a preferred embodiment, the scan abutment is provided with a cylinder-shaped shaft in the upper and/or central and/or lower region, which may be mated on an implant with low tolerance. This scan abutment may be screwed on an implant by a screw. The screw is conically designed at the shaft outer diameter below the screw head. An analogous conical region is formed in the inner region of the scan abutment, in particular by the inner surface of the side wall of the central and, optionally, of the lower region being conically designed and the cone tapering to terminally. The scan abutment is slitted in the lower region. The slitted region of the scan abutment is pressed apart by screwing in of the screw into the cone of the scan abutment, and the outer fitting geometry of the scan abutment mates to the inner fitting geometry of the implant.

According to a second particularly preferred embodiment, the conical region of the aforementioned scan abutment is pressed apart by a pushed in bolt instead of a screw. In this case, concentrated pressing apart of the fitting geometry is made under simultaneously jamming and holding the scan abutment in the fitting geometry of the implant. Preferably, the outer side wall of the shaft is formed as fitting geometry in the lower region, preferably pointing outwardly and terminally, as shown in FIG. 1c, and, optionally, is provided with an undercut to the outer central region or with an outwardly facing nose (B), in particular an edgy (keeping) nose (B), as shown in FIG. 2c.

Figures 1A, 1B, 1C:
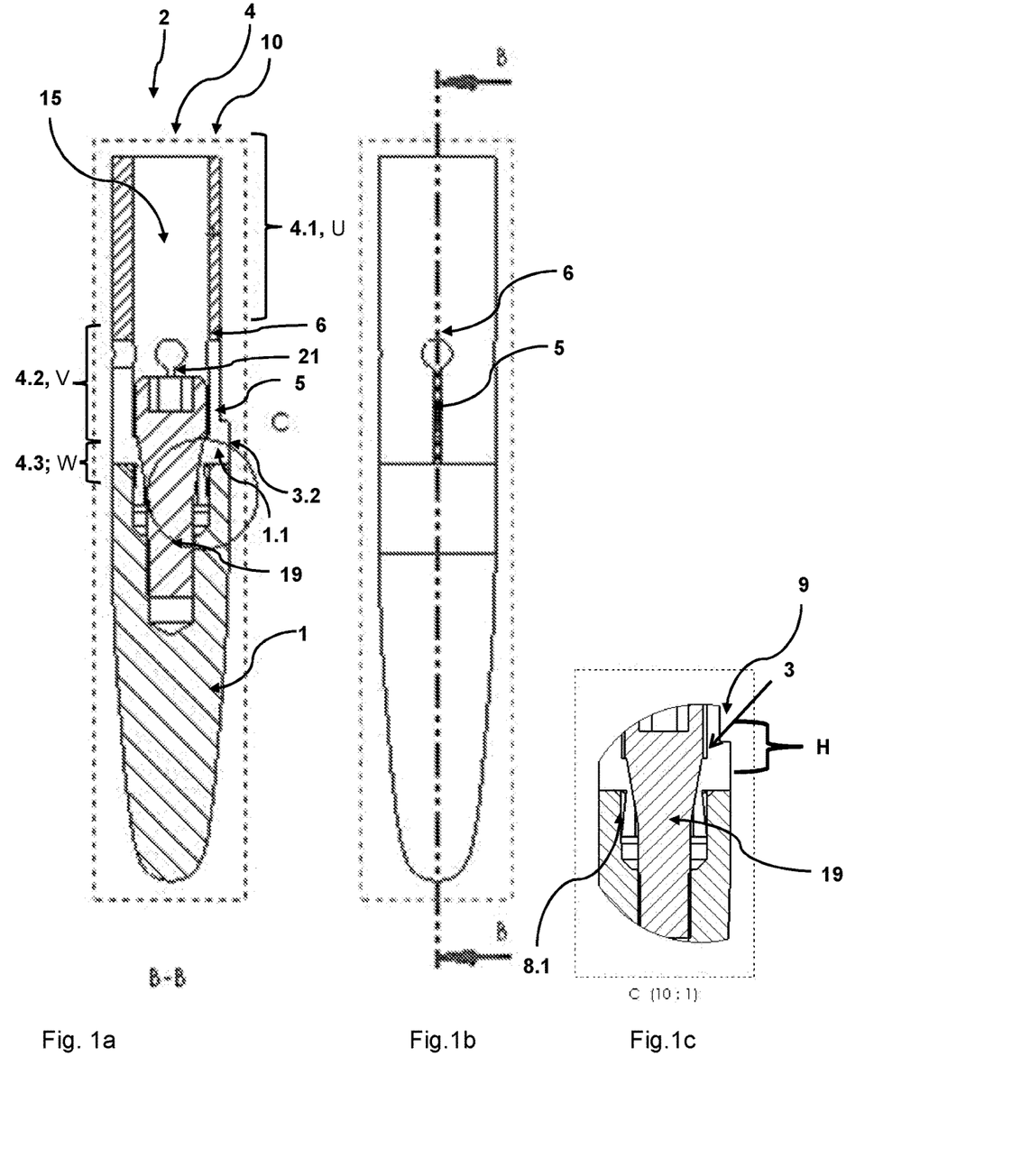
FIG. 1*a*: longitudinal cross-section plane B
FIG. 1*b*: view across to plane B
FIG. 1*c*: section C of FIG. 1*a* of a scan abutment 2 with screw 19
Figure 2A:
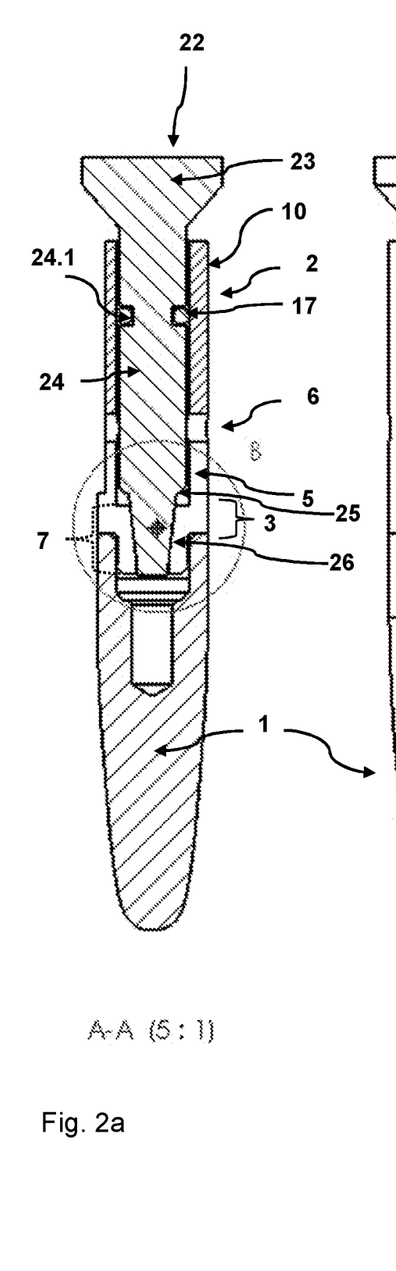
FIG. 2*a*: longitudinal cross-section plane B with implant FIG. 2*e* similar to FIG. 2*a* without implant.
Figures 2B, 2C:
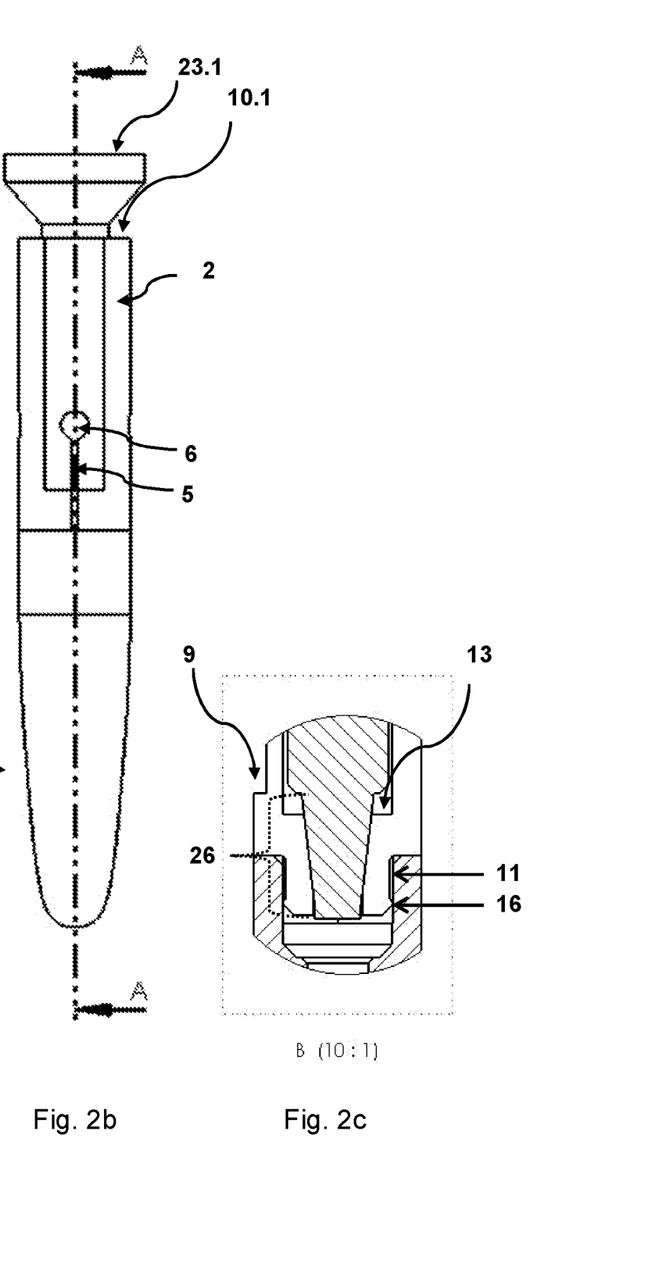
FIG. 2*b*: view across to plane B with implant FIG. 2*f* similar to FIG. 2*b* without implant
FIG. 2*c*: section C of FIG. 2*a* of a scan abutment 2 with bolt 22 with implant, FIG. 2*d* similar to FIG. 2*c* without implant.

The design of the fitting geometry of the scan abutment, in particular the lower region of the shaft of the two aforementioned embodiments, may be cylindrical, thus having straight walls, or may taper to terminally, thus pointing, as shown in FIG. 1c in section (C), or may be provided with an at least two to manifoldly discontinued edge, as shown in FIG. 2c in section (B). The edge may correspond to an outer nose.

Preferably, a dental endosseous implant is presently understood to mean an implant being in the jaw of a patient or a laboratory analog of the implant in the real or virtual model of the jaw.

Thus, a subject matter of the invention is a scan abutment for determination of the position (x,y,z-coordinates) of the front face of a dental endosseous implant, wherein the abutment has a longish, hollow shaft, wherein the shaft has an upper region, a central region and a lower region, and the shaft with its central region with at least a part of its bottom side is attachable onto the front face of the implant, and the lower region is insertable into the connection geometry of the implant, and the longish, hollow shaft is formed from a side wall, wherein the shaft has at least two to terminally extending slits in its central region and lower region in the side wall.

According to a further preferred embodiment, the slits respectively end in a recess in the side wall to coronally and extend terminally in the side wall to the bottom side of the shaft, i.e. to the bottom side of the side wall to apically. Preferably, the recesses are hollow recesses, in particular the recesses have a curved margin, such as an elliptic, oval, cylindrical margin, preferably the recesses are circular. Preferably, the recesses are arranged in the central region of the shaft, preferably in a region to the upper region of the shaft.

The recess in the central region of the shaft is arranged above the base. Later, in the installation situation, the base with its bottom side lays on the front face of an implant. The position of the recess in the central part of the scan abutment serves for reducing the force, which occurs for fixation of the scan abutment by means of a bolt pushable into the scan abutment or a screw. The shaft in the lower region and, optionally, central region is widened by the pushed bolt or the screw screwed into the scan abutment, and concentrically and coaxially orient the scan abutment in the connection geometry of the implant. The particular advantage of the scan abutment according to the invention is that fastening and concentrically or axially orientation, respectively, of the scan abutment in connection geometries of implants having smooth inner surfaces is possible by the specific position of the slits in the central and lower region of the shaft. The geometry of the slits according to the invention which preferably have a low width is also advantageous for the orientation.

The slits of the scan abutments according to the invention only serve for compensating the tolerance in the implant connection geometry such that the lower region of the shaft fit closely into the connection geometry of the implants. Due to the fact that the slits are arranged in the central region, the possible deflection of the legs formed is greater. The slits in the lower region of the shaft preferably have a width of approximately 0.1 to 0.4 mm, preferably 0.1 to 0.3 mm, particularly preferably about 0.2 mm with a low tolerance of +1-0.025 mm. The advantage of the slits according to the invention in the central and lower region also allows the shaft geometry to be preserved, this increases the scan accuracy.

According to the state of the art, the slits and recesses as well as noses in the lower region below the base serve for jamming in the connection geometry of the implants by the slits being compressed, and the noses catching under tension into the connection geometry of the implant, by the legs widening back to their original position.

Preferably, the slits according to invention are formed such that they may only be widened, i.e. the legs may only be pressed apart in the lower region. Therefore, the angle of the slits may only be enlarged from approximately 0° with starting point in the recess in a range of 1 angular minute (1') to 20°, preferably from 1' to 10°, 5' to 5°. Preferably, the slit or slits only have a width of 0.1 to 0.2 mm.

In addition, it is particularly preferred for the ratio of the heights of the lower (W) and central (V) region of the shaft to amount from 1:1 to 1:4, preferably from 1:2 to 1:4, particularly preferably 1:2 to 1:3.

Preferably, the ratio of the heights of the central (V) and upper (U) region of the shaft may amount from 1:1 to 1:4, preferably from 1:1.5 to 1:3.

Moreover, it is preferred for the shaft of a scan abutment a) to have at least two axial slits laying in an axial plane (B) or axial plane (A) of the shaft, or b) the shaft has at least four axial slits laying in the axial plane (B) and the axial plane (A) of the shaft. According to further preferred alternatives, the shaft may have 2 to 20 slits, wherein each slit preferably lay in an axial plane of the shaft. The distribution of the slits among the periphery of the shaft may arbitrarily be chosen. According to a preferred embodiment, the slits are preferably spaced in the side wall of the shaft in an angle of approximately 90°.

According to a further preferred embodiment of the invention, the side wall of the lower region of the shaft has at least one outer diameter being smaller than the diameter of the side wall of the central and, optionally, of the upper region of the scan abutment, wherein the side wall of the lower region has at least one undercut in its outer periphery in the direction of the central region of the side wall, preferably below the base. Preferably, an outer edge is formed at the outer periphery of the side wall by this undercut. According to the invention, it is particularly preferred for the side wall of the lower region to have subterminally to terminally at its outer periphery at least one outwardly facing edge on the side wall. Preferably, a circumferential edge only being discontinued by the slits.

If the side wall of the lower region, in particular of a cylindrical region, of the shaft has an outer diameter being smaller than the diameter of the side wall of the central and, optionally, of the upper region of the scan abutment, in particular cylindrical region, a circumferential ledge respectively shoulder may be formed at the bottom side of the central region or the base may be formed in the central region.

The at least one outwardly facing edge may be formed as a fold, groove-shaped with two outer edges, or, preferably, having an acute interior angle of less than 90°, preferably of less than or equal to 85°, 80°, 75°, 70°, 65°, 60°, or as circumferential wall extending almost perpendicular on the outer periphery of the sides, or in the form of an acute-angled edge. The edge according to the invention is discontinued at least two to manifold, in particular by the slits. Thus, the edge may have at least a number of through holes corresponding to the number of slits. Alternatively, the edge may have more through holes to define the contact points with the fitting geometry of the implant more accurately.

Wherein, according to the invention, defined contact points up to defined contact lines, which are jammed with the inner surface of the connection geometry or fitting geometry, respectively of the implant, are formed by the undercut, the edge or the nose.

According to a further embodiment of the scan abutment, the inner surface of the side wall of the central region and, optionally, of the lower region of the shaft is conically designed, wherein the cone tapers in terminal direction to the bottom side of the scan abutment or of the shaft, respectively. According to a further alternative, the inner diameter of the inner surface of the side wall of the central region and, optionally, of the lower region of the shaft decreases to terminally. According to an alternative, the diameter of the central region decreases whereas the diameter in the adjacent lower region corresponds to the smallest diameter of the central region or the diameter widen to terminally. An internal thread may be provided area by area in the lower region.

Moreover, a subject matter of the invention is a scan abutment in which the inner surface of the side wall of the central region and, optionally, of the lower region is conically designed and the cone tapers in terminal direction to the bottom side of the scan abutment, wherein an inner widening of the inner surface or a circular cylindrical inner surface subsequently adjoins to the conically tapered region in the lower region.

According to a further particularly preferred embodiment of the scan abutment, an O-ring is arranged in the upper region of the shaft. Preferably, the O-ring horizontally extend inside the inner periphery of the side wall, in particular partially in a groove circumferenting on the inside on the inner periphery of the side wall, and serves for holding a bolt having a corresponding groove, with which the scan abutment may be clamped onto an implant or spacer of an implant.

According to a further preferred alternative, the side wall of the lower region of the shaft of the scan abutment has at least one outer diameter being smaller than the diameter of the side wall of the central and, optionally, of the upper region, and wherein the side wall of the lower region subterminally to terminally at its outer periphery has an outwardly facing nose on the sidewall. Preferably, the nose is circumferentially provided and is, in particular, only discontinued by the slits. Reference to the diameter of the central or upper region preferably refers to an average diameter of these regions in case these regions should have vertical grooves, waves, undercuts or the like. In an embodiment, the lower region is provided with an undercut in the direction of the central region, in particular a single undercut directly below the bottom side of the base, and is subterminally to terminally provided with a preferably circumferential nose, only being discontinued by the slits. In a further embodiment, the lower region is cylindrical, in particular circular cylindrical, and is subterminally to terminally provided with a preferably circumferential nose, only being discontinued by the slits.

In this case, according to a further alternative, it is preferred for the side wall of the lower region of the shaft to have a cylindrical, cylindrical provided with grooves, or another suitable geometry. Preferably, the lower region of the shaft is circular cylindrical and has an outer diameter being smaller than the diameter of the side wall of the central and optionally, of the upper region. In particular, the smaller diameter serves for providing the nose provided in the lower region, preferably subterminally to terminally, with a defined height. Preferably, the vertical height of the nose amounts at least from 0.01 mm to 2 mm, preferably 0.05 mm to 1 mm.

In the case of scan abutments of the state of the art, the aforementioned determination of the height position of the implant front face(s) is solely made by a scan of the upper front face of the abutments. However, the coronal front face of the scan abutments is usually spaced approximately 10 mm or more from the front face of the implants such that thereby the manufacturing tolerances of this geometry are very high for known scan abutments. The scan abutments according to the invention may have one or more surfaces not laying on the coronal front face of the scan abutment, synonymously to the upper side of the shaft of the scan abutment, at a distance of about 10 to 15 mm to the coronal front face of the implant, but preferably at a distance of still 1 to 3 mm. In doing so, the tolerances may be reduced by about approx. 50%. Like this, DIN ISO 2768-1 specifies general tolerances—fine from 2+/−0.05 mm up to 10+/−0.1 mm. ISO 286 specifies a tolerance system for measures of length of plastic turned parts of category A according to tolerance series 9 and measures of 1 to 3 mm from 0.025 mm and for measures of 10 to 18 mm from 0.043 mm. In particular, the additional planar surface lies in the planar plane of the upper side of the base.

However, the whole available diameter is required for the shaft of the scan abutment due to the low diameters of implants, which are usually between 3.3 and 6.0 mm. Consequently, the whole surface for height determination in known systems automatically fell on the upper front face of the scan abutment, synonymously upper side of the shaft. However, the upper front race of the abutment is furthest spaced from the front face of the implant. In order now to obtain a parallel surface to the front face of the implant having smallest possible distance, e.g. 2 mm, it is proposed according to the invention to discontinue the shaft, preferably to 90° of its periphery in an alternative. This through hole of the shaft may be formed greater or less than 90°, in particular in the form of an arch segment. If a through hole having an opening angle of less than <90° is chosen, the surface formed has not an optimal size and is may happen that the surface may not be measured with the desired accuracy. If an opening angle of the through hole of greater than >120° is chosen, the scan accuracy of the shaft decreases. Balance and increase of the scan accuracy of the parallel surfaces being formed by the through hole and the upper side of the shaft of the scan abutment is achieved with an opening angle of approximately 90° to less than or equal to 120°.

Furthermore, in the case of scan abutments for larger implant diameters from approximately 4.5 mm an increment of the lower region of the shaft to the base may be made, whereby a further surface, in particular a circumferential, further surface occurs. This surface serves for increase of the planar-parallel total surface (surfaces 6+7), in turn preferably being planar-parallel to the coronal implant front face, which may be measured still better and more accurately by the scanner.

According to the invention, the height (X) of the base preferably is at greater than or equal to 0.1 to 10 mm, in particular from 0.75 to 5 mm, preferably from about 1 to 3 mm, in particular having a tolerance of plus/minus 0.1, preferably to plus/minus 0.05 mm.

Another subject matter of the invention is a scan abutment with a shaft having a base in the central region to which the lower region of the shaft adjoins, wherein the base preferably has a planar surface. Particularly preferably, the base has a horizontal, planar surface, preferably circumferential surface, at the outer periphery of the shaft. A surface not being circumferential, in particular in the form of an arch segment, may be formed by a through hole of the shaft in the upper region. Preferably according to the invention, the diameter of the shaft in the region of the base (central region) is larger than the diameter of the shaft in the upper region and forms a planar surface circumferenting around the shaft of the upper region. Preferably, this surface is parallely arranged to the plane of the bottom side of the base and/or the plane of the upper side of the shaft. Particularly preferably, the scan abutment may have both a planar surface in the form of an arch segment and a circumferential planar surface, in particular on the base.

Preferably, the longish shaft may have a cylindrical outer side wall or, alternatively, be formed polyhedrally, cylindrically, star- or wave-shapely, cone-shapely and/or spherically, or rotationally symmetrically along the main axis, such as, for example, a circular cylinder or a spheroid. Moreover, the aforementioned side wall of the shaft may have at least one planar surface at the outer side wall, such as, for example, of an arbitrary conical section of the shaft or spherical section of the shaft.

In the case of particularly preferred scan abutments, the side wall may have the form of a cylinder, in particular of a right prism, preferably with the base of a square or pentagon with an edge length of the base of 3.5 mm to 6.5 mm, particularly preferably having almost rectangular cross-section. In this case, it is particularly preferred for the right prism, in particular a prism having rectangular cross-section, preferably having quadratic cross-section, to have rounded vertical edges in the height of the prism. Preferably, the radius of the edges amounts from 0.1 to 1 mm.

According to a further preferred embodiment of the invention, a dental screw, in particular for use for fastening of a scan abutment according to the invention onto a dental implant, is disclosed, which, where appropriate, may be provided with a spacer, wherein the screw has a screw head, in particular having a polygonal inside-socket- or torx-geometry, preferably an inside-hexagon socket- or inside-octagon socket-geometry, and a shaft is arranged below the screw head, wherein the shaft has an external thread in at least one region, wherein the shaft of the screw tapers conically at least in part at its outer periphery in the direction of the lower end of the screw.

Preferably, the shaft has a cylindrical outer periphery of the shaft having an external thread below the outer periphery tapering conically to the lower end of the screw. The screw has a conical outer periphery of the shaft and a cylindrical outer periphery of the shaft, which has at least in part an external threat below the conical region. Preferably, the external thread is terminally, preferably subterminally, arranged at the shaft. Particularly preferably, the screw has an addition external thread above or below the tapered region in order to be able to fasten the scan abutment onto an implant.

According to an alternative preferred embodiment, a dental bolt is disclosed, in particular for use for fastening of a scan abutment on a dental implant or a spacer, wherein the bolt has a bolt head and a shaft below the bold head, wherein a groove is arranged in the region of the outer periphery of the shaft of the bolt. In particular, the groove is arranged in a region below the bolt head and preferably above the platform, preferably the groove is a circumferential groove. Moreover, the bolt preferably has a platform in the lower region of the shaft, subsequent to the platform the shaft further tapers, preferably the shaft at least in part conically tapers to subterminally up to terminally below the platform. The platform is formed to serve as seating surface for the screw head or bolt head at the inner periphery of the side wall in the central region of the shaft.

The groove of the bolt, in particular a circumferential groove, is formed according to the invention to be able to receive the O-ring, in particular a horizontally arranged O-ring, being arranged in the upper region of the shaft of the scan abutment, and to ensure in that arrangement a fixed and very exact alignment clamp connection of the scan abutment at an implant or spacer. Preferably, coaxially orientation of the longitudinal axis of the scan abutment with the longitudinal axis of the implant may be ensured by the scan abutment according to the invention and the screw according to the invention and the bolt. Compared to usual fastening means, the dental screw according to the invention or the dental bolt are characterised by a very high accuracy and particularly low tolerance. The screw and the bolt must be accurately adjusted to the inner diameter of the scan abutment to eliminate the existing circumferential gap, being formed by the undercut at the outer periphery of the shaft, between the scan abutment and the implant during expanding, in particular the undercut has a depth of approx. 0.01 to 0.5 mm, in particular from 0.01 to 0.3 mm, particularly preferably from 0.05 to 0.2 mm. The below mentioned materials of which the scan abutment may be manufactured come into consideration as materials for the screw or the bolt Likewise, a kit comprising at least one scan abutment according to the invention and at least one dental screw according to the invention or one dental bolt according to the invention is disclosed.

Another subject matter of the invention is the use of a screw according to the invention or a bolt for fastening, in particular screwing or clamping, a scan abutment on a dental implant or on a spacer of a dental implant. The use of screw according to the invention or of a bolt according to the invention for coaxially orientation and fastening of the scan abutment on the implant is also a subject matter of the invention.

Moreover, a subject matter of the invention is the use of the upper side of the side wall of the scan abutment for Z-position determination, as well as of further planar surfaces, preferably laying perpendicularly to the longitudinal medial axis or parallely to the longitudinal medial axis of the scan abutment and, optionally, laying parallely to the longitudinal axis, for determination of the position and orientation of the front face as well as of the longitudinal axis of the implant.

The respective planes according to the invention are understood to mean those geometric planes which may be laid, for example, into the respective surfaces, front faces, uppers sides or bottom sides, such as, in particular, the plane between shaft and base, as respectively one plane may be laid into the surface of the shaft or between the bottom side of the shaft and the upper side of the base or into the front face of the implant.

The longish, hollow shaft is formed by the side wall forming the outer boundary of the shaft, wherein the hollow shaft has an inner lumen extending along the longitudinal axis. In particular, the side wall is cylindrical, and may be discontinued according to the invention and/or have a lower diameter than the base.

Preferably, the surface of the scan abutment is substantially smooth, wherein surfaces having a $R_a$-value of $R_a$ (roughness value) smooth less than or equal to 1.6 μm are considered as smooth. The $R_a$-value may also amount less than or equal to 12.5 μm. Values above 12.5 μm are less preferred, because the greater the value of the $R_a$-value, the less the surface is suitable for a detailed scan. Like this, values of greater than 12.5 to 50 μm are not well suited for high accuracy. Particularly preferred, the surfaces of the scan abutments are provided at least in part with a smooth surface structure, preferably a surface of the side wall and, optionally, of the upper side of the shaft may be provided with a smooth surface structure, such as preferably $R_a$=less than or equal to 1.6 μm. For this purpose, the surfaces or at least the surfaces to be scanned may have been laser polishes or polished with another method known by the person skilled in the art.

The material of the scan abutments according to the invention, screws and/or bolts may be selected from a polymeric material, filled polymeric material, metal, an alloy, such as titanium, cobalt chrome, gold, a fiber-reinforced polymer, hybrid material wherein the polymeric material may be selected from fluoropolymers, polysulfide-containing polymers, polysulfone-containing polymers, polyaryletherketones, polyimides, PC (polycarbonate), PAEK (polyaryletherketones), PEEK (polyetherether-ketones), PEK (polyetherketones); PEKK (poly(etherketoneketones)), PEEEK (poly(etheretheretherketones)), PEEKK (poly(etheretherketoneketones)), PEKEKK (poly(etherketoneether-ketoneketones); PES (polyarylsulfones), PPSU (polyarylsulfones), PSU (polysulfones), PPS (polyphenylene sulfides), PFA (perfluoroalkoxy polymers), PFE (poly(fluorenylene ethynylene) polymers), PVDF (polyvinylidene fluorides), PCTFE (polytetrafluoroethylenes), PAI (polyamide imides), PI (polyimides), PEI (polyetherimides), PBI (polybenzimidazoles). Cobalt chrome, titanium, gold etc. may preferably be used as metallic alloys or metals.

The embodiments shown in the following figures show exemplary subject matters according to the invention without restricting the invention to these subject matters.

The features according to the invention are generally transferable to all shaft geometries being common to the person skilled in the art or being conceivable. The scan abutments may also be produced from any material being common to the person skilled in the art.

FIG. 1*a* shows a scan abutment 2 having a shaft 4 and a side wall 10, wherein the shaft 4 has an upper region 4.1, a central region 4.2 and a lower region 4.3. The central region 4.2 comprises a base 3 (FIG. 1*c*) having a planar surface 9. The surface 9 may be formed circumferentially and/or as arch segment in a through hole of the side wall. The base has a height H. Moreover, slits 5 are provided in the side wall 10 of the shaft in the central region 4.2 to terminally into the lower region 4.3 to enable expanding of the shaft 4 and thereby orientation and jamming into a connection geometry of an implant. Accurately fitting jamming is made by means of a defined contact of the circumferential edge 8.1 being discontinued by the slits 5, and, wherein the edge is pressed to the inner surface of the connection geometry of the implant by expanding. Orientation and very accurately fitting fixation of the scan abutment onto the implant is made by virtue of expanding according to the invention in combination with the edge 8.1 or nose 16. The outer edge 8.1 may have an interior angel alpha (α) less than 90°.

Figure 3:
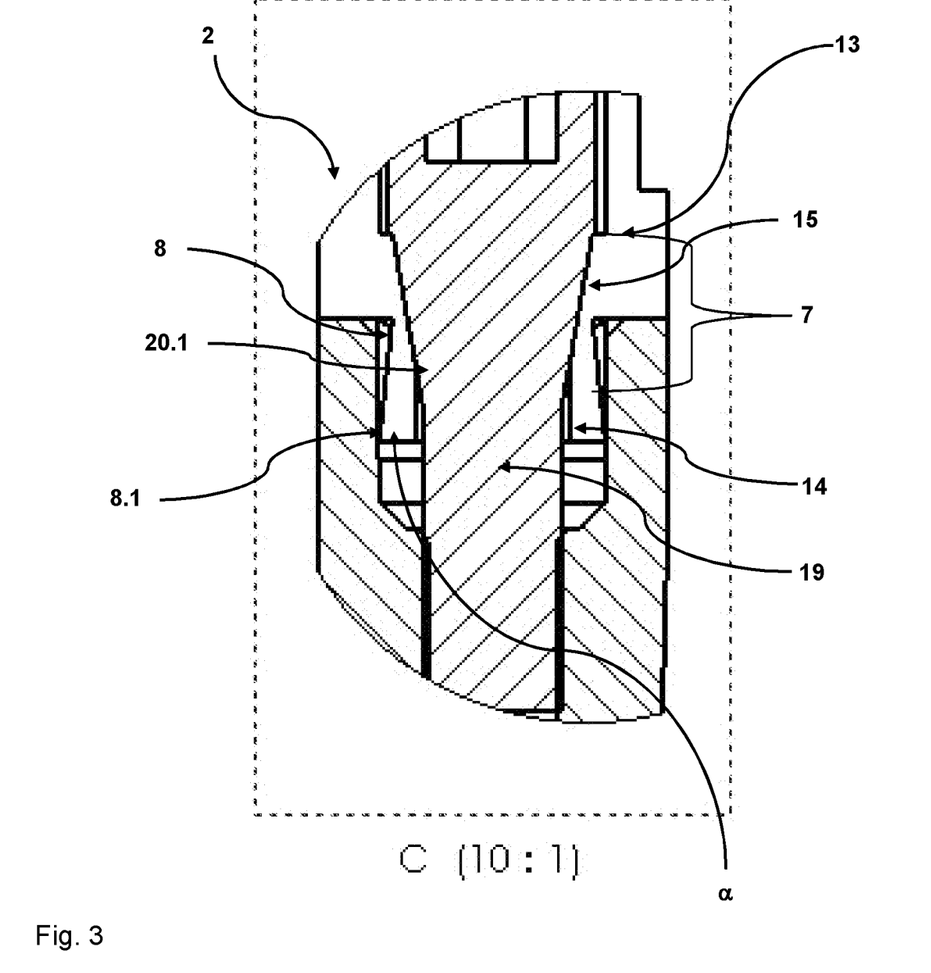
FIG. 3: larger representation of the section of FIG. 1*c*

The abutment of FIGS. 1*a*, 1*b* and 1*c* has four axial slits ending in circular recesses 6 in the central region 4.2 of the shaft. The base 3 with its planar bottom side 3.2 lies on the front face 1.1 of an implant 1. The inner surface 15 of the side wall 10 of the shaft 4 is in part conically 7 formed in the central and lower region of the shaft 4 and tapers to terminally, s. FIG. 3. The scan abutment 2 is screwed onto the implant 1 by a screw 19 having screw head 21. The side wall is provided with an outer edge 8.1 and an undercut 8, as shown in FIGS. 1*a* and 3, at the outer periphery in the lower region 4.3. As shown in FIG. 3, the inner surface of the side wall may have a widening or circular cylindrical shape of the inner surface 14 in the lower subterminal to terminal region compared to the conical region lying above. In addition, the platform 13 for receiving the screw head 19 or bolt head 22 is provided at the inner periphery of the side wall in the central region 4.2 of the shaft 4 in FIG. 3.

Figure 2D:
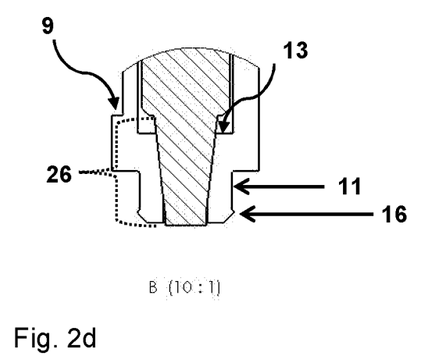
Figure 2E:
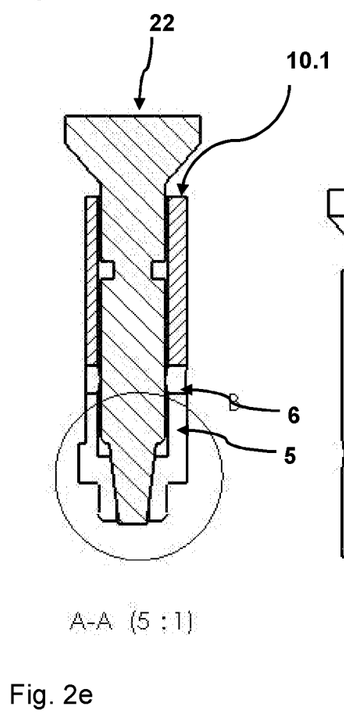
Figure 2F:
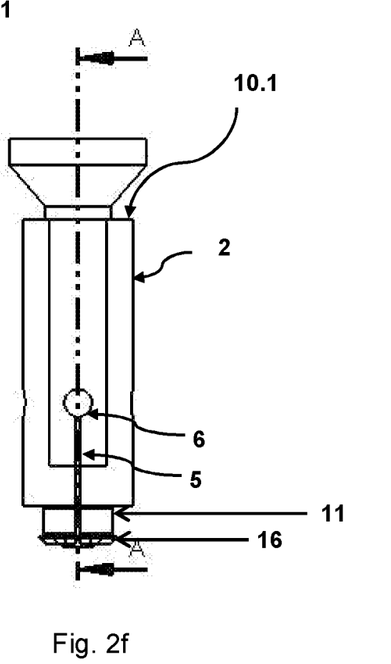
Figure 2G:
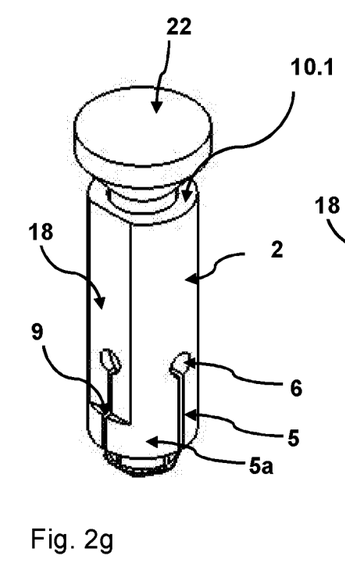
FIGS. 2*g* and 2*h*: scan abutment with representation of the planar side wall 18 and nose 16 terminally at the outer periphery of the side wall
Figure 2H:
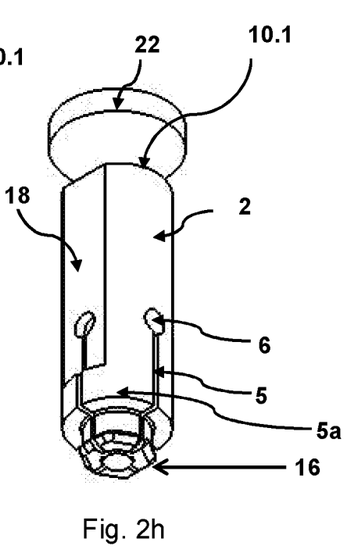

FIGS. 2*a*, 2*b*, 2*c*, 2*d*, 2*e*, 2*f*, 2*g*, 2*h* and 4 show an alternative scan abutment 2 being jammed onto the front face 1.1 of an implant 1 by a bolt 22. FIG. 2*a* shows a scan abutment 2 with a bolt 22. The scan abutment 2 has a shaft 4 having an upper region 4.1, central region 4.2 and lower region 4.3, analogous to the scan abutment of FIGS. 1*a*, 1*b*, 1*c* and 3, wherein the shaft 4 or the side wall 10, respectively, has in total four axial slits 5 staggered by 90°, having circular recesses 6 at their upper ends, in which the slits 5 end. A base 3 is shown in the central region 4.2 of the shaft 4 having a non-circumferential surface 9, in particular in the form of a planar surface 18 as shown in FIGS. 2*g* and 2*h* or in the form of an arch segment based on a through hole of the side wall 10 of the shaft 4 (not shown). For example, the shaft has a cylindrical, preferably outside-hexagon socket- or octagon socket-periphery 11 in the lower region 4.3 to be received into the corresponding inside-octagon or inside-hexagon socket geometry of an implant 1. According to the invention, the shaft may also have a different connection geometry, such as e.g. a cylindrical with 3 noses staggered on 120° or a star-shaped connection geometry. An outer nose 16 is provided at the terminal outer periphery of the lower region 4.3 of the shaft, which is pressed against the inner wall of the implant by receiving and jamming of the bolt 22. The scan abutment 2 is automatically coaxially orientated and fastened to the implant 1 by pushing and jamming the bolt 22.

In addition, the shaft 4 has an at least in part conical design 7 of the inner surface of the side wall 10 in the central and lower region 4.2, 4.3 tapering in the direction of the bottom side of the scan abutment. The conical region 7 is adjusted to the conical region 26 of the shaft 24. Moreover, a platform 13 is provided in FIGS. 2*c*, 2*d* and 4 at the inner periphery of the side wall 10 in the central region 4.2 of the shaft 4, which is formed for receiving a circumferential platform 25 provided at the shaft 24 of the bolt. The bolt 22 has a circumferential groove 24.1 in which the O-ring 17 is caught during pushing the bolt 22 into the scan abutment 2. In FIGS. 2*b*, 2*e*, 2*f*, 2*g* and 2*h*, the upper side 10.1 of the scan abutment is formed as planar, scannable surface. In addition, the legs 5*a* formed on both sides of the slits are shown, which serve for axial and concentric orientation of the scan abutment in the connection geometry of the implant.

FIGS. 2*d*, 2*e* and 2*f* show the section according to FIG. 2*c* without implant, in which the conical region 26 of the bolt as well as platform 13 in the shaft 4, the polygonal outer periphery 11 of the shaft 4 in the lower region 4.3 of the side wall 10, in particular as outside-hexagon or octagon socket are disclosed, since implants often have an inside-hexagon or octagon socket-connection geometry as anti-rotation device. Further outer nose(s) 16 are disclosed subterminally to terminally at the outer periphery of the side wall 10 of the shaft 4, or circumferential from slit to slit, or outwardly facing nose, respectively, preferably a nose provided with a sharp edge.

FIG. 3 shows a section of the scan abutment 2 with screw 19 of FIG. 1c. The screw 19 has a conical design, i.e. conical region, 7 of the inner surface of the side wall 10 tapering in the direction of the bottom side of the scan abutment. Moreover, the undercut 8 with the outer edge 8.1 is shown at the outer periphery in the lower region 4.3 of the shaft 4 or of the sidewall 10, respectively, wherein the outer edge has an interior angle alpha ($\alpha$) less than 90°, to an acute interior angle. 14 shows the cylindrical inner surface or the inner widening to terminally of the inner surface of the side wall 10 of the shaft below the conical design 7, of the inner surface 15 of the side wall 10 of the shaft 4. Moreover, the conical outer periphery 20.1 of the shaft 20 of the screw 19 is shown.

Figures 4, 5A, 5B, 5C:
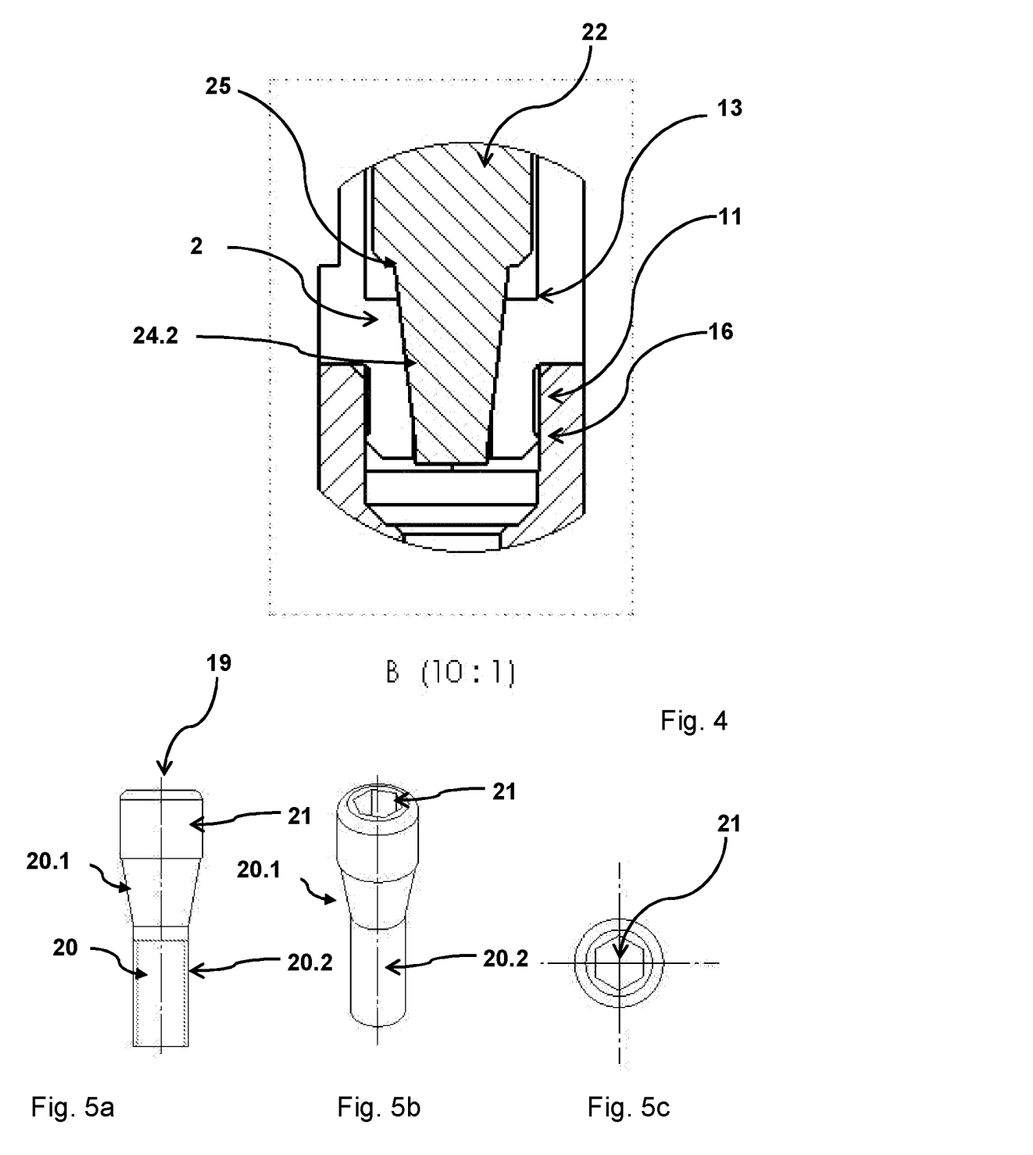
FIG. 4: larger representation of the section of FIG. 2*c*
FIGS. 5*a*, 5*b* and 5*c*: screw 19 according to the invention

FIG. 4 shows a section of FIG. 2c of the scan abutment 2 having a platform 13 in the inner surface of the side wall 10 of the shaft 4 above the conical design and polygonal outer periphery 11 of the shaft 4 in the lower region 4.3 and having nose 16. Likewise, the bolt 22 is shown having a platform 25 in the lower region at which the bolt downwardly tapers conically 24.2 to terminally.

In FIG. 5, a screw 19 according to the invention having screw head 21 and shaft of the screw 20 is shown, which has a conical outer periphery 20.1 of the shaft 20 and a cylindrical outer periphery 20.2 of the shaft 20 having at least in part an external thread below the conical region. Preferably, the external thread is terminally, preferably subterminally, arranged at the shaft. The screw head 21 may have an inside-hexagon/octagon socket- or torx-geometry.

Figure 6A:
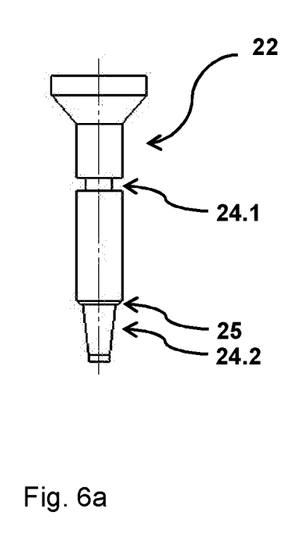
FIGS. 6*a*, 6*a* and 6*c*: bolt 22 according to the invention
Figure 6B:
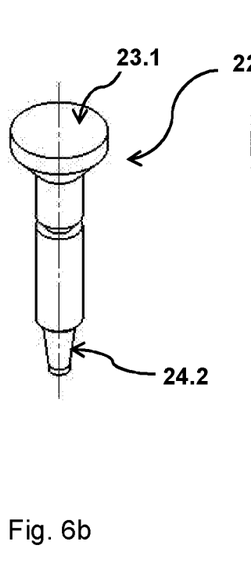
Figure 6C:
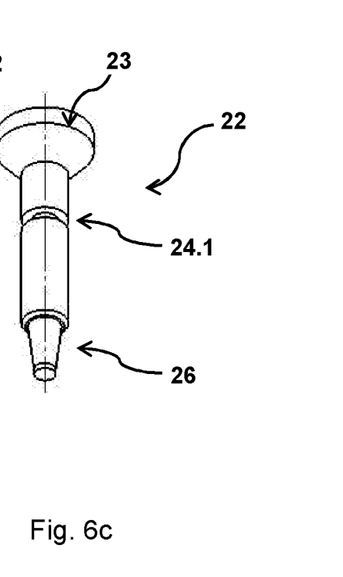

FIG. 6 shows a bolt 22 according to the invention having bolt head 23 and having a groove 24.1, in particular a circumferential groove 24.1 in the region of the outer periphery of the shaft 24, wherein the bolt has a platform 25 in the lower region at which the bolt tapers downwardly, and the bolt tapers conically 24.2 to terminally. The bolt has a conical region 26 at the shaft. In particular, the upper side of the bolt 23.1 is formed as planar plane or surface.

REFERENCE SIGNS 1 implant, front face (1.1) of the implant (1)
2 scan abutment
3 base
 the base (3) with at least a part of its bottom side (3.2)
4 shaft with slits (5) and recess (6) at the upper end of the slits,
4.1 upper region of the shaft (4.1) or of the side wall (10), respectively, above the slit (5) and the recess (6), height upper region (U)
4.2 central region of the shaft (4.2) or of the side wall (10), respectively, comprising the slits (5) and the recesses (6) as well as the base (3), height central region (V)
4.3 lower region of the shaft (4.3) or of the side wall (10), respectively, in particular with connection geometry, to fasten the abutment into a connection geometry of an implant, height lower region (W)
5 slits in the side wall (10) of the shaft (4) in the region 4.2 and/or 4.3 to terminally,
5a legs
6 recesses in the upper region of the slit (5)
7 conical design of the inner surface of the side wall (10) tapering in the direction of the bottom side of the scan abutment, conical region
8 undercut at the outer periphery in the lower region (4.3) of the shaft (4) or of the side wall (10), respectively, 8.1 outer edge, wherein the outer edge has an interior angle alpha ($\alpha$) less than 90°, to an acute interior angle
9 planar surface
10 side wall forming the shaft or side wall of the shaft, respectively; 10.1 upper side of the side wall, in particular with planar plane or surface
11 polygonal outer periphery of the shaft (4) in the lower region (4.3) of the side wall (10), in particular as outer-hexagon or octagon socket, since implants often has an inside-hexagon or octagon socket-connection geometry as anti-rotation device.
13 platform in the inner surface of the side wall (10) of the shaft (4) above the conical design (7)
side wall (10) of the shaft below the conical design (7)
15 inner surface of the side wall (10) of the shaft (4)
16 outer nose subterminally to terminally at the outer periphery of the side wall (10) of the shaft (4), or circumferential from slit to slit, or outwardly facing nose, respectively, preferably a nose provided with a sharp edge,
17 O-ring
18 planar surface of the side wall of the shaft
19 screw
20 shaft of the screw
20.1 conical outer periphery of the shaft (20) of the screw (19)
20.2 cylindrical outer periphery of the shaft (20) of the screw (19) below 20.1 with external thread
21 screw head, in particular with inside-hexagon/octagon connection geometry
22 bolt with bolt head (23), and a groove (24.1), in particular a circumferential groove (24.1), in the region of the outer periphery shaft (24) of the bolt, wherein the bolt may have a platform (25) in the lower region, at which the bolt tapers downwardly, and the bolt tapers conically (24.2) to terminally; 23.1 upper side of the bolt, in particular with planar plane or surface, 26 conical region of the shaft of the bolt
A axial plane of the shaft (4)
B axial plane of the shaft (4)

The invention claimed is:

1. Scan abutment (2) for determination of the position (x,y,z-coordinates) of a front face (1.1) of a dental endosseous implant (1), wherein the abutment (2) has a longish, hollow shaft (4), wherein the shaft (4) has an upper region (4.1), a central region (4.2) and a lower region (4.3), wherein the shaft (4) has a base (3) in the central region (4.2) with a planar bottom side (3.2), to which the lower region (4.3) of the shaft (4) adjoins, and the shaft (4) with its central region (4.2) with at least a part of the bottom side (3.2) of the central region (4.2) is attachable onto the front face (1.1) of the implant (1), and the lower region (4.3) is insertable into the connection geometry of the implant, and the longish, hollow shaft (4) is formed from a side wall (10),
 wherein
 the shaft (4) in its central region (4.2) and lower region (4.3) in the side wall (10) has at least two slits (5), each of which slits (5) extend in an apical direction from said central region (4.2) through said lower region (4.3) and terminate at a bottom of said side wall (10), and
 wherein the scan abutment (2) is material-integral.

2. Scan abutment according to claim 1, wherein the shaft (4), in its central region (4.2) and lower region (4.3) in the side wall (10), has at least two
   a) axial slits (5), or
   b) slits being inclined with respect to an axial orientation.

3. Scan abutment according to claim 2, wherein the shaft (4), in its central region (4.2) and lower region (4.3) in the side wall (10), has at least two
   a) axial and parallel slits (5), or
   b) slits being inclined from 10° to 30° with respect to the longitudinal axis.

4. Scan abutment according to claim 1, wherein the slits (5) end in a recess (6) in the side wall (10) at their upper end and extend terminally in the side wall (10) to the bottom side of the shaft (4).

5. Scan abutment according to claim 1, wherein the shaft (4)
   a) has at least two axial slits (5) laying in an axial plane (B) or axial plane (A) of the shaft, or
   b) has at least four axial slits (5) laying in the axial plane (B) and in the axial plane (A) of the shaft.

6. Scan abutment according to claim 1, wherein the side wall (10) of the lower region (4.3) of the shaft (4) has at least one outer diameter being smaller than the diameter of the side wall (10) of the central (4.2), and wherein the side wall (10) of the lower region (4.3) has at least one undercut (11) in its outer periphery in the direction of the central region (4.2) of the side wall (10).

7. Scan abutment according to claim 1, wherein the side wall (10) of the lower region (4.3) subterminally to terminally at its outer periphery has at least one outwardly facing edge (8.1) on the side wall (10).

8. Scan abutment according to claim 1, wherein the inner surface (15) of the side wall (10) of the central region (4.2) is conically (7) designed, and the cone tapers in terminal direction to the bottom side of the scan abutment (4).

9. Scan abutment according to claim 1, wherein an O-ring (17) is arranged in the upper region (4.1) of the shaft (4).

10. Scan abutment according to claim 1, wherein the side wall (10) of the lower region (4.3) of the shaft (4) has at least one outer diameter being smaller than the diameter of the side wall (10) of the central (4.2), and wherein the side wall (10) of the lower region (4.3) subterminally to terminally at its outer periphery has an outwardly facing nose (16) on the sidewall (10).

11. Scan abutment according to claim 1, wherein the shaft (4) has a base (3) in the central region (4.2) to which the lower region (4.3) of the shaft (4) adjoins, wherein the base has a planar surface (9).

12. Scan abutment according to claim 1, wherein the side wall (10) of the lower region (4.3) of the shaft (4) has at least one outer diameter being smaller than the diameter of the side wall (10) of the central (4.2) and of the upper (4.1) region, and wherein the side wall (10) of the lower region (4.3) has at least one undercut (11) in its outer periphery in the direction of the central region (4.2) of the side wall (10).

13. Scan abutment according to claim 1, wherein the inner surface (15) of the side wall (10) of the central region (4.2) and of the lower region (4.3) is conically (7) designed, and the cone tapers in terminal direction to the bottom side of the scan abutment (4).

14. Scan abutment according to claim 1, wherein the side wall (10) of the lower region (4.3) of the shaft (4) has at least one outer diameter being smaller than the diameter of the side wall (10) of the central (4.2) and of the upper (4.1) region, and wherein the side wall (10) of the lower region (4.3) subterminally to terminally at its outer periphery has an outwardly facing nose (16) on the sidewall (10).

15. Kit comprising at least one scan abutment according to claim 1 and at least one of (A) or (B):
   (A) a dental screw (19), wherein the screw has a screw head (21), optionally having a polygonal inside-socket- or torx-geometry, optionally of an inside-hexagon socket- or inside-octagon socket-geometry, and a shaft is arranged below the screw head, wherein the shaft has an external thread in at least one region, wherein the shaft (20) of the screw tapers conically (20.1) at least in part at its outer periphery (20.1) in the direction of the lower end of the screw; or
   (B) a dental bolt (22), optionally for use for fastening of a scan abutment according to claim 1 on a dental implant, wherein the bolt (22) has a bolthead (23) and a shaft (24) below the bolt head, wherein a groove (24.1) is arranged in the region of the outer periphery of the shaft (24) of the bolt, and wherein the bolt has a platform (25) in the lower region of the shaft (24), at which the shaft (24) further tapers, and the shaft (24) at least in part conically to terminally (24.2) tapers below the platform.

16. A method comprising fastening a scan abutment according to claim 1 on a dental implant or on a spacer of a dental implant with (A) or (B):
   (A) a dental screw (19), wherein the screw has a screw head (21), optionally having a polygonal inside-socket- or torx-geometry, optionally of an inside-hexagon socket- or inside-octagon socket-geometry, and a shaft is arranged below the screw head, wherein the shaft has an external thread in at least one region, wherein the shaft (20) of the screw tapers conically (20.1) at least in part at its outer periphery (20.1) in the direction of the lower end of the screw; or
   (B) a dental bolt (22), optionally for use for fastening of a scan abutment according to claim 1 on a dental implant, wherein the bolt (22) has a bolthead (23) and a shaft (24) below the bolt head, wherein a groove (24.1) is arranged in the region of the outer periphery of the shaft (24) of the bolt, and wherein the bolt has a platform (25) in the lower region of the shaft (24), at which the shaft (24) further tapers, and the shaft (24) at least in part conically to terminally (24.2) tapers below the platform.

17. A method comprising coaxial orientation and fastening of the scan abutment according to claim 1 on an implant with (A) or (B):
   (A) a dental screw (19), wherein the screw has a screw head (21), optionally having a polygonal inside-socket- or torx-geometry, optionally of an inside-hexagon socket- or inside-octagon socket-geometry, and a shaft is arranged below the screw head, wherein the shaft has an external thread in at least one region, wherein the shaft (20) of the screw tapers conically (20.1) at least in part at its outer periphery (20.1) in the direction of the lower end of the screw; or
   (B) a dental bolt (22), optionally for use for fastening of a scan abutment according to claim 1 on a dental implant, wherein the bolt (22) has a bolthead (23) and a shaft (24) below the bolt head, wherein a groove (24.1) is arranged in the region of the outer periphery of the shaft (24) of the bolt, and wherein the bolt has a platform (25) in the lower region of the shaft (24), at which the shaft (24) further tapers, and the shaft (24) at least in part conically to terminally (24.2) tapers below the platform.

\* \* \* \* \*

UNITED STATES PATENT AND TRADEMARK OFFICE
CERTIFICATE OF CORRECTION

PATENT NO. : 11,207,157 B2
APPLICATION NO. : 15/771428
DATED : December 28, 2021
INVENTOR(S) : Matthias Funk It is certified that error appears in the above-identified patent and that said Letters Patent is hereby corrected as shown below:

In the Specification

Column 5, Line 58, "+1-0.025 mm" should read -- +/-0.025 mm --.

Column 8, Line 10, "tolerances–fine" should read -- tolerances – fine --.

Column 8, Line 23, "front race" should read -- front face --.

Column 9, Line 42, "external threat" should read -- external thread --.

Column 12, Line 2, "interior angel" should read -- interior angle --.

In the Claims

Column 15, Line 14, Claim 4 "extend terminally in the side" should read -- extend in the side --.

Signed and Sealed this
Fourth Day of April, 2023

Katherine Kelly Vidal
*Director of the United States Patent and Trademark Office*